(12) United States Patent
Horner et al.

(10) Patent No.: US 11,926,785 B2
(45) Date of Patent: Mar. 12, 2024

(54) PROCESSING PRODUCED FLUIDS FOR FLUID RECOVERY

(71) Applicant: Halliburton Energy Services, Inc., Houston, TX (US)

(72) Inventors: Stephen John Horner, Needville, TX (US); Ronald Oliver Bosch, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/832,901

(22) Filed: Jun. 6, 2022

(65) Prior Publication Data
US 2022/0298404 A1 Sep. 22, 2022

Related U.S. Application Data

(62) Division of application No. 16/928,031, filed on Jul. 14, 2020, now Pat. No. 11,384,272.

(60) Provisional application No. 62/883,108, filed on Aug. 5, 2019.

(51) Int. Cl.
| | |
|---|---|
| *C09K 8/28* | (2006.01) |
| *C09K 8/36* | (2006.01) |
| *C09K 8/532* | (2006.01) |
| *E21B 43/34* | (2006.01) |
| *C09K 8/60* | (2006.01) |

(52) U.S. Cl.
CPC .................. *C09K 8/28* (2013.01); *C09K 8/36* (2013.01); *C09K 8/532* (2013.01); *E21B 43/34* (2013.01); *C09K 8/602* (2013.01); *C09K 2208/20* (2013.01); *C09K 2208/22* (2013.01); *C09K 2208/26* (2013.01)

(58) Field of Classification Search
CPC . C09K 8/28; C09K 8/36; C09K 8/532; C09K 8/602; C09K 2208/20; C09K 2208/22; C09K 2208/26; C09K 8/035; E21B 43/34
See application file for complete search history.

(56) References Cited

U.S. PATENT DOCUMENTS

| | | | |
|---|---|---|---|
| 4,082,867 A | 4/1978 | Henley et al. | |
| 4,502,977 A | 3/1985 | Buriks et al. | |
| 4,741,835 A | 5/1988 | Jacques et al. | |
| 4,938,876 A * | 7/1990 | Ohsol | C02F 1/683 210/182 |
| 5,223,175 A * | 6/1993 | Mabire | B01D 53/1493 252/189 |
| 7,677,315 B2 | 3/2010 | Saini et al. | |
| 2011/0155646 A1 | 6/2011 | Karas et al. | |
| 2014/0209510 A1 * | 7/2014 | Harrington | C10G 29/20 208/207 |

FOREIGN PATENT DOCUMENTS

| | | |
|---|---|---|
| CN | 103274499 | 9/2013 |
| WO | 1989009091 | 10/1989 |
| WO | 2017099706 | 6/2017 |

OTHER PUBLICATIONS

Ezell (AADE-08-DF-HO-33; 2008).*
Notice of Allowance for U.S. Appl. No. 16/928,031 dated Apr. 27, 2022.
Office Action Summary for U.S. Appl. No. 16/928,031 dated Dec. 14, 2021.

* cited by examiner

*Primary Examiner* — Kumar R Bhushan
(74) *Attorney, Agent, or Firm* — Thomas Rooney; C. Tumey Law Group PLLC

(57) ABSTRACT

A method is disclosed that includes adding a recirculation chemical composition to a hydrocarbon containing stream, wherein the recirculation chemical composition may be an emulsion breaker. The method may also include separating the hydrocarbon containing stream into a stream containing water and a stream containing oil; contacting the stream containing oil in a water wash unit; and removing residual emulsion breaker from the stream containing oil.

19 Claims, 2 Drawing Sheets

PROCESSING PRODUCED FLUIDS FOR FLUID RECOVERY

BACKGROUND

During production of oil and gas from a subsea or deepwater formation producing zones, surface separation equipment may separate oil and water from a recovered fluid. A portion of the oil may be separated and recirculated back to the wellhead to assist in hydrate control, to manage flow rates to allow for production rates that may be lower than the design of the separation equipment, or for other purposes necessary for production chemical treatment. Chemical additives may be included in the oil prior to reintroduction into the wellhead to assist in proper functioning of systems to assist in agglomeration control and corrosion protection. Alternatively, chemical additives may be produced alongside oil and gas from previous chemical introduction of the chemical additive into the producing zone. Many of these chemical additives may have surfactant properties which may cause an emulsion of oil and water to form; thereby causing separation issues in downstream equipment. Furthermore, separated water may contain a fraction of oil and grease that may be unsuitable for overboard release in offshore applications.

BRIEF DESCRIPTION OF THE DRAWINGS

These drawings illustrate certain aspects of some of the present disclosure and should not be used to limit or define the disclosure.

DETAILED DESCRIPTION

Figure 1:
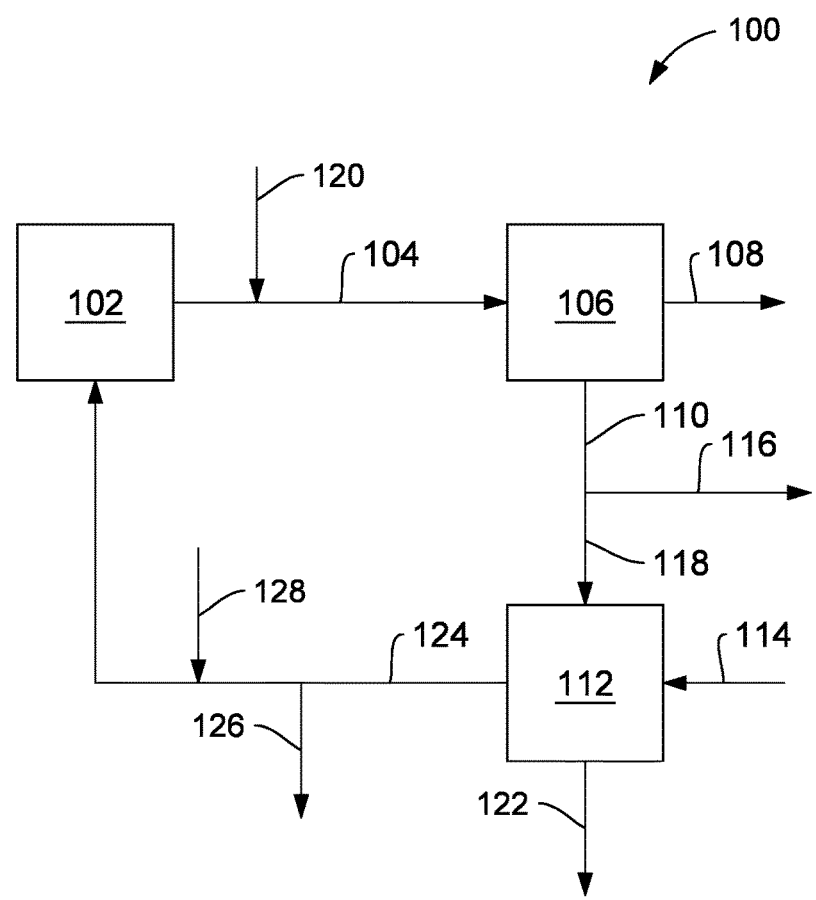
FIG. 1 illustrates a process for treatment of produced fluids from a wellhead in accordance with embodiments disclosed herein.

This disclosure may relate to methods and processes for recovering and recirculating oils and/or water from produced fluids. A recirculation chemical composition may be used during the recycle stage of production, wherein the recirculation chemical composition may strip away chemicals that may be hazardous to the process, equipment, and environment if recycled back into the production stream. Embodiments of the recirculation chemical compositions disclosed herein may be used a demulsifier or an emulsion breaker, scavengers, and the like. The recirculation chemical compositions disclosed herein may also especially be suitable for use in offshore applications, such as subsea and deepwater applications. As used herein, the terms "demulsifier" and "emulsion breaker" may be used interchangeably. It should also be noted that deepwater environments and definitions have changed through the decades as oil and gas capabilities and technology have transformed. As used herein, a deepwater environment may be defined as subsea wellheads at a depth of about 300 meters ("m") or greater, whereas "ultra-deepwater" may be defined as subsea wellheads at depths of about 1500 in or greater.

Moreover, embodiments of the recirculation chemical compositions disclosed herein may also be suitable for use in various oilfield applications, including subterranean applications, and fracturing applications. For example, embodiments disclosed herein may be applicable to horizontal, vertical, deviated, or otherwise nonlinear wellbores in any type of subterranean formation. Further, embodiments disclosed herein may be applicable to injection wells, monitoring wells, and production wells, including hydrocarbon or geothermal wells.

The recirculation chemical compositions disclosed herein that may function as emulsion breakers may be used to separate emulsions, such as water-in-oil and oil-in-water (reverse emulsions). Emulsion breakers may be commonly used in the processing of crude oil, which may be typically produced along with significant quantities of salt water or brine. emulsion breakers may be used for effective oil recovery, and to improve the quality of reusable water. Further, demulsifiers may protect downstream facilities.

In some embodiments, the recirculation chemical compositions disclosed herein may be used as emulsion breakers prior to fluid separation, followed by a water wash to further remove or decrease undesirable components in the produced fluid. In some embodiments, the water wash may be utilized to reduce the presence of amines in a produced fluid to produce a pipeline quality oil product. Moreover, embodiments of the recirculation chemical compositions that may be used as emulsion breakers may be comprised of acid catalyzed phenol-formaldehyde resins, base catalyzed phenol-formaldehyde resins, epoxy resins, polyethyleneimines, polyamines, di-epoxides, polyols, and combinations thereof. In some embodiments, the recirculation chemical compositions that may function as emulsion breakers may comprise a mixture of two or more chemical compositions in carrier solvents. The carrier solvents may include, but are not limited to, heavy aromatic naphtha, xylene, diesel, isopropanol, 2-ethylhexanol, and methanol.

The recirculation chemical compositions disclosed herein may be used as emulsion breakers to strip surfactants from process streams or produced fluid streams. Surfactants or production chemicals having surfactant properties may cause problems in process streams and equipment downstream of the original application. For example, corrosion inhibitors may be applied to reduce or mitigate corrosion, while causing separation or water quality issues in the processing facilities downstream. The methods, compositions, and systems disclosed herein may utilize chemicals and process equipment to process incoming fluids, thereby removing corrosion inhibitors and the like, such that the resulting fluids may be suitable for recirculation or for subsequent processing.

Surfactants may be used in a variety of subsea and deepwater operations, as well as various subterranean operations. Such operations include, but are not limited to, drilling operations, stimulation treatments (e.g., fracturing treatments, acidizing treatments), and completion operations (e.g., sand control treatments). In these various operations, surfactants may be used for a number of purposes, including, but not limited to emulsifying agents, non-emulsifying agents, foaming agents, defoaming agents, viscosifying (e.g., gelling) agents, dispersants, wetting agents, and the like.

While a variety of surfactants may be used in subsea or deepwater operations, as well as subterranean operations, various problems may be associated with their use. For example, certain surfactants used heretofore may have undesirable environmental characteristics and/or may be limited by strict environmental regulations in certain areas of the world. As a result, use of these surfactants may result in the potential for the bioaccumulation and/or persistence of such surfactants in the environment, which may create potential dangers for their use, such as adverse effects on shrimp and other aqueous aquatic species. Additionally, certain surfactants may tend to oil wet a surface which may be undesirable in certain instances.

In some embodiments, under suitable conditions, the methods disclosed herein for the removal of the emulsified oil from the water may comprise adding about 5 ppm to about 200 ppm of the recirculation chemical composition, wherein the recirculation chemical composition may be used as an emulsion breaker, to waste-water comprising emulsified oil droplets. Alternatively, under suitable conditions, the methods disclosed herein for the removal of the emulsified oil from the water may comprise adding about 5 ppm to about 200 ppm, about 10 ppm to about 150 ppm, about 20 ppm to about 100 ppm about 30 ppm to about 90 ppm, about 40 ppm to about 80 ppm, or about 50 ppm to about 70 ppm of the recirculation chemical composition, wherein the recirculation chemical composition may be used as an emulsion breaker, to waste-water comprising emulsified oil droplets.

After contacting the emulsion breaker with the emulsified oil droplets, under suitable conditions for a prescribed time period of 30 minutes or less (or up to 30 minutes), the emulsified oil droplets may begin to separate by normal separation methods using gravity, enhanced gravity, electro-coalescence, flotation, heat accelerated coalescence, flocculation, and simple gravity separation, into a layer that is distinct from the water layer. It should be noted that the oil layer may be separated as a distinct layer from the water layer by conventional methods such as common separators or skimmers, including, but not limited to: free water knock-outs, electrostatic coalescers, heater treaters, desalters, flotation units, corrugate plate interceptors, hydrocyclones, and centrifuges.

In some embodiments, the methods disclosed herein for the removal of the emulsified oil from the water may comprise adding a recirculation chemical composition to a hydrocarbon containing stream, wherein the recirculation chemical composition is an emulsion breaker The method may further comprise separating the hydrocarbon containing stream into a stream containing water and a stream containing oil. The method may further provide contacting the stream containing oil in a water wash unit, and removing residual surfactant chemistry from the stream containing oil. In some embodiments disclosed herein, the method may further provide recirculating the stream containing water, recirculating the stream containing oil, or both streams for further processing. In some embodiments, the hydrocarbon containing stream may comprise a viscosified treatment fluid.

FIG. 1 illustrates a process for treatment of produced fluids from a wellhead in accordance with embodiments disclosed herein. FIG. 1 illustrates a process 100 for treatment of produced fluids 104 from wellhead 102. Produced fluids 104 may include oil and water which may exit wellhead 102. Recirculation chemical composition stream 120 may be added to produced fluids 104 before produced fluids 104 are conveyed to oil/water separation unit 106, wherein recirculation chemical composition stream 120 may be used as an emulsion breaker. In oil/water separation unit 106, a water containing stream 108 and oil containing stream 110 may be generated. Water containing stream 108 may include a majority of the water present in produced fluids 104. Oil containing stream 110 may include a majority of the oil present in produced fluids 104. Recirculation chemical composition stream 120 added to produced fluids 104 may aid in separation of oil and water, whereby water containing stream 108 may not contain oil and grease in amounts that exceed allowable concentrations for overboard discharge. A portion of the emulsion breaker of recirculation chemical composition stream 120 added to produced fluids 104 may remain in the oil phase and may subsequently be discharged from oil/water separator 106 in oil containing stream 110. The presence of emulsion breakers in oil containing stream 110 may interfere with additives that are included in oil containing streams downstream of oil/water separator 106.

Oil containing stream 110 may exit oil/water separation unit 106 whereby a portion of the oil may be drawn off as oil product steam 116, wherein the balance of oil from oil containing stream 110 may be conveyed to water wash unit 112 as oil slip stream 118. Alternatively, all of oil containing stream 110 may be conveyed to water wash unit 112. Water wash stream 114 may be introduced into water wash unit 112, whereby oil from oil slip stream 118 and water from water wash stream 114 may be brought in contact with one another. The emulsion breaker present in the oil may be transferred to the water within water wash unit 112. Water wash unit 112 may further comprise separation equipment that may be used for separating the oil and water within water wash unit 112 to produce water stream 122 and oil stream 124.

Oil stream 124 may exit water wash unit 112 and may be conveyed to wellhead 102. In some embodiments, an oil product stream 126 may be drawn off oil stream 124 prior to introduction of oil stream 124 to wellhead 102. Alternatively, all of oil stream 124 may be conveyed to wellhead 102 after water wash unit 112. Before introduction into wellhead 102, an anti-agglomeration additive may be added via additive line 128. Anti-agglomeration additives may be used to treat gas hydrates.

The recirculation chemical compositions disclosed herein may also be used as a hydrogen sulfide scavenger in oil and gas production. Hydrogen sulfide is a very toxic and pungent gas that may cause problems in both upstream and downstream in the oil and gas industry. The process of removing hydrogen sulfide is known as gas sweetening, wherein this process may be accomplished by either iron sponge hydrogen sulfide scrubbers or chemical scavengers.

The recirculation chemical compositions disclosed herein that may be used as hydrogen sulfide scavengers that may include, but are not limited to triazine scavengers, solid scavengers, oxidizing Chemicals, aldehydes, and metal carboxylates and chelates. Triazine scavengers may generally include monoethanolamine (MEA), diethanolamine (DEA), N-methyldiethanolamine (MDEA), diisopropylamine, diglycolamime (DGA), also known as 2-(2-aminoethoxy) ethanolamine, and combinations thereof. The solid scavengers may generally include, but are not limited to zinc or iron-based materials. Oxidizing chemicals may include, but are not limited to $NaClO_2$, $NaBrO_3$, and $NaNO_2$. Aldehydes may include glyoxal, which may be applied in neutral, acidic, and alkaline conditions. Metal carboxylates and chelates may include both water and oil soluble high valence metal chelates, and may be used as hydrogen sulfide scavengers for treating contaminated water and oil streams in addition to drilling fluids.

In some embodiments disclosed herein, methods may comprise adding a recirculation chemical composition to a hydrocarbon containing stream, wherein the recirculation chemical composition may be a hydrogen sulfide scavenger. The method may further comprise applying the hydrogen sulfide scavenger through an in-line injection system to disperse the hydrogen sulfide scavenger into the hydrocarbon containing stream. The method may further comprise separating the hydrocarbon containing stream into a stream containing water and a stream containing oil, contacting the stream containing oil in a water wash unit, and removing residual hydrogen sulfide scavenger from the stream containing oil. The method may further comprise recirculating the stream containing water, the stream containing oil, or both streams for further processing. In some embodiments disclosed herein, the method may be accomplished with existing facility equipment. In other embodiments disclosed herein, the method may be accomplished with temporary vessels.

In some embodiments disclosed herein, methods may comprise producing a hydrogen containing stream comprising water, oil, and hydrogen sulfide. The method may further include adding a first recirculation chemical composition to the hydrocarbon containing stream, wherein the first recirculation chemical composition may be a hydrogen sulfide scavenger. The method may further comprise adding a second recirculation chemical composition to the hydrocarbon containing stream, wherein the second recirculation chemical composition may be an emulsion breaker. The method may further comprise applying the hydrogen sulfide scavengers through an in-line injection system to disperse the hydrogen sulfide scavengers into the hydrocarbon containing stream. The method may further comprise separating the hydrocarbon containing stream into a stream containing water and a stream containing oil, contacting, the stream comprising oil in a water wash unit, and removing the residual hydrogen sulfide scavenger and emulsion breaker from the stream containing oil. The method may further comprise recirculating the stream containing oil, the stream containing water, or both streams for further processing.

In some embodiments disclosed, herein, methods using hydrogen sulfide scavengers may comprise applying the recirculation chemical composition through an in-line injection system to disperse the recirculation chemical composition into the gas stream to maximize reaction. A contact tower may be used to improve efficiency if weight and space is not a constraint. The concentration of the recirculation chemical composition may be calculated based on the amount of sulfur to be removed.

In some embodiments, a system may be used wherein the process equipment may be temporary or permanently installed. The methods disclosed herein may include providing the recirculation chemical composition for the purpose of scavenging the hydrogen sulfide a process stream, wherein the process stream comprises undesirable hydrogen sulfide and other desirable chemicals, such as corrosion, scale, hydrate, paraffin, or asphaltene inhibitors. The stream containing desirable chemicals may then be regenerated, usually by heating, and reused in the system.

In some embodiments, the methods disclosed herein may include placing a recirculation chemical composition in a hydrocarbon product stream during a separation and/or recovery process, wherein the recirculation chemical compositions may include both an emulsion breaker and a hydrogen sulfide scavenger. Moreover, in some embodiments, the methods disclosed herein may include obtaining or providing the recirculation chemical composition. The obtaining or providing of the recirculation chemical composition may occur at any suitable time and at any suitable location. For example, in some embodiments, the obtaining or providing of the recirculation chemical composition may occur above the surface. Moreover, one or more recirculation chemical compositions may be used, depending upon the specific process and application. For example, one or more recirculation chemical compositions may be formulated above-surface to form an emulsion breaker and/or a hydrogen sulfide scavenger.

Figure 2:
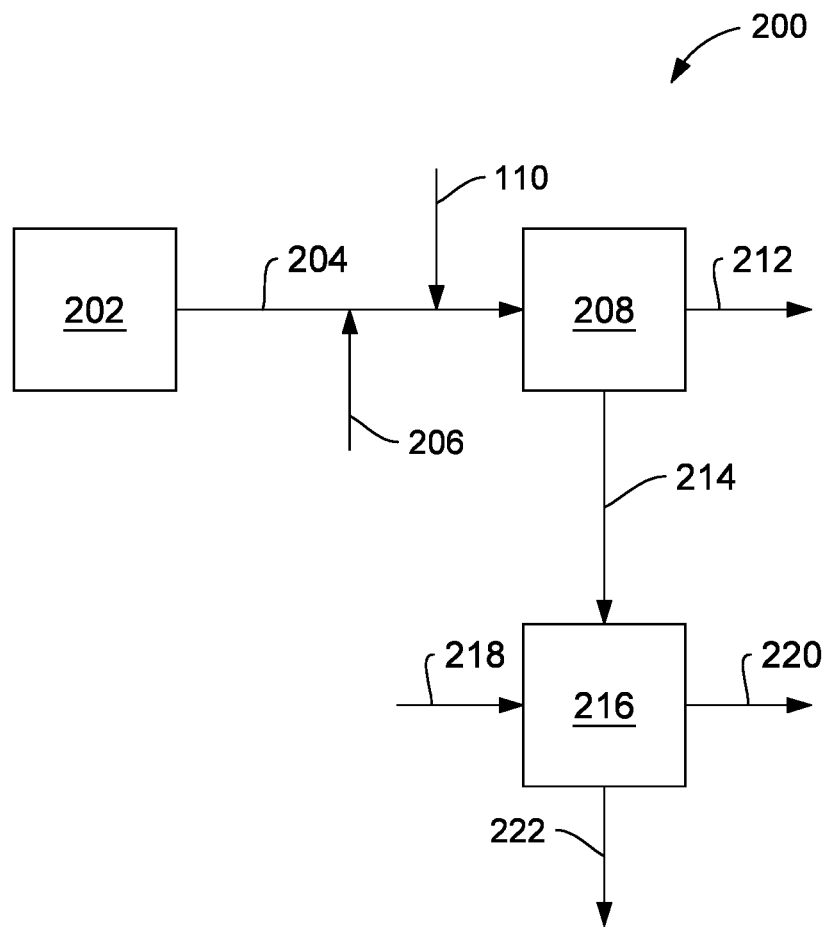
FIG. 2 illustrates a process for treatment of hydrogen sulfide in accordance with embodiments disclosed herein.

FIG. 2 illustrates a process for removal of hydrogen sulfide in accordance with embodiments disclosed herein. More specifically, FIG. 2 illustrates a process 200 for removal of hydrogen sulfide. A hydrocarbon source 202 may be provided. According to some embodiments disclosed herein, the hydrocarbon source 202 may be a wellhead, surface production equipment, or an oil/water separation unit such as oil/water separation unit 106 as shown in FIG. 1. Hydrocarbon source 202 may include water and oil, and may be contaminated with hydrogen sulfide. There may be limits to hydrogen sulfide content in saleable hydrocarbons and hydrocarbons to be introduced into a pipeline. In some embodiments, it may be necessary to process the hydrocarbons to reduce the concentration of hydrogen sulfide prior to the sale of the hydrocarbons or introduction into a pipeline. Triazines used to reduce the hydrogen sulfide content in the hydrocarbon prior to transport or sale may produce residual amines such as monomethylamine (MMA) or monoethanolamine (MEA). However, refineries may limit the content of residual amine and reacted amine products in hydrocarbons such that in reducing the hydrogen sulfide content of hydrocarbons, the hydrocarbons may become unsaleable.

As illustrated in FIG. 2, a hydrocarbon stream 204 containing water, oil, and hydrogen sulfide, from hydrocarbon source 202 may be combined with a first recirculation chemical composition introduced in hydrogen sulfide scavenger stream 206 comprising amines. The triazines and their resulting amine by-products may react with the hydrogen sulfide in hydrocarbon stream 204 to produce reaction products such as bisulfide and the corresponding protonated amine. A second recirculation chemical composition introduced in emulsion breaker stream 110 may add an emulsion breaker to hydrocarbon stream 204. Hydrocarbon stream 204 may be conveyed to oil/water separator 208, whereby the oil and water present in hydrocarbon stream 204 may be separated into water stream 212 and oil stream 214. The second recirculation chemical composition introduced in emulsion breaker stream 110 and added to hydrocarbon stream 204 may cause emulsified water to separate from bulk oil. A majority of residual amines, reaction products, and unreacted hydrogen sulfide may be transferred to the water such that the majority of the residual amines, reaction products, and unreacted hydrogen sulfide may leave oil/water separator 208 in water stream 212.

Oil stream 214 may be conveyed to water wash unit 216, whereby oil stream 214 may be brought in contact with water from water stream 218. In water wash unit 216, the concentration of residual amine, reaction products, and unreacted hydrogen sulfide in oil stream 214 may be reduced by transferring the residual amine, reaction products, and unreacted hydrogen sulfide to the water provided by water stream 218. Water wash unit 216 may include equipment used to separate oil and water. Wastewater stream 220 may contain a majority of the residual amine or hydrogen sulfide scavenger, emulsion breaker, reaction products, and unreacted hydrogen sulfide from oil stream 214 entering water wash unit 216. A cleaned oil stream 222 may exit water wash unit 216 which may contain amine levels at or below levels acceptable for sale, transport, or pipelining.

In some embodiments disclosed herein, the process equipment may include an oil and gas separator, wherein an oil and gas separator may comprise a pressure vessel used for separating a well stream into gaseous and liquid components. Oil and gas separators may be installed either in an onshore processing station or on an offshore platform. Based on the vessel configurations, the oil and gas separators may be divided into horizontal, vertical, or spherical separators.

In terms of fluids to be separated, the oil and gas separators may be grouped into gas/liquid two-phase separator or oil/gas/water three-phase separator. Based on separation function, the oil and gas separators may also be classified into primary phase separator, test separator, high-pressure separator, low-pressure separator, deliquilizer, degasser, etc. To meet process requirements, the oil and gas separators may be designed in stages, in which the first stage separator may be used for preliminary phase separation, while the second and third stage separators may be applied for further treatment of each individual phase (gas, oil and water). Depending on a specific application, oil and gas separators may also be called deliquilizers or degassers. The deliquilizers may be used to remove dispersed droplets from a bulk gas stream, while the degassers may be designed to remove contaminated gas bubbles from the bulk liquid stream.

Embodiments disclosed herein may include recirculation systems that may also perform as mixing systems. Process equipment utilized in the disclosed methods and systems may include, but may not be limited to, centrifugal mixing pumps, mixing hoppers, mixing jets, tanks, and shakers. The process equipment may be existing facility equipment or temporary fit-for purpose rental equipment.

The methods, compositions, and systems may include any of the various features of the methods, compositions, and systems disclosed herein, including one or more of the following statements:

Statement 1. A method may comprise: adding a recirculation chemical composition to a hydrocarbon containing stream, wherein the recirculation chemical composition is an emulsion breaker; separating the hydrocarbon containing stream into a stream containing water and a stream containing oil; contacting the stream containing oil in a water wash unit; and removing residual emulsion breaker from the stream containing oil.

Statement 2. The method of statement 1, further comprising contacting the hydrocarbon containing stream for up to 30 minutes prior to separating the hydrocarbon containing stream into a stream containing water and a stream containing oil.

Statement 3. The method of statement 1 or 2, further comprising recirculating the stream containing water.

Statement 4. The method of any of the preceding statements, further comprising recirculating the stream containing oil.

Statement 5. The method of any of the preceding statements, further comprising recirculating the stream containing water and the stream containing oil.

Statement 6. The method of any of the preceding statements, wherein the residual emulsion breaker is removed in an amount of about 45% to about 77%.

Statement 7. The method of any of the preceding statements, wherein the method is accomplished with existing facility equipment.

Statement 8. The method of any of the preceding statements, wherein the method is accomplished with temporary vessels.

Statement 9. The method of any of the preceding statements, wherein the recirculation chemical composition comprises at least one additive selected from the group consisting of acid catalyzed phenol-acid formaldehyde resins, base catalyzed phenol-formaldehyde resins, epoxy resins, polyethyleneimines, polyamines, di-epoxides, polyols, and combinations thereof.

Statement 10. The method of any of the preceding statements, wherein the hydrocarbon containing stream comprises a viscosified treatment fluid.

Statement 11. The method of any of the preceding statements, wherein the hydrocarbon containing stream is an oil-in-water emulsion.

Statement 12. The method of any of the preceding statements, wherein the hydrocarbon containing stream is a water-in-oil emulsion.

Statement 13. A method may comprise: adding a recirculation chemical composition to a hydrocarbon containing stream, wherein the recirculation chemical composition is a hydrogen sulfide scavenger; separating the hydrocarbon containing stream into a stream containing water and a stream containing oil; contacting the stream containing oil in a water wash unit; and removing residual hydrogen sulfide scavenger from the stream containing oil.

Statement 14. The method of statement 13, further comprising applying the hydrogen sulfide scavenger through an in-line injection system to disperse the hydrogen sulfide scavenger into the hydrocarbon containing stream before separating the hydrocarbon containing stream.

Statement 15. The method of statement 13 or 14, wherein the hydrogen sulfide scavenger comprises at least one additive selected from the group consisting of triazine scavengers, solid scavengers, oxidizing chemicals, and aldehydes, metal carboxylates and chelates, and combinations thereof.

Statement 16. The method of statement 13, 14, or 15, further comprising recirculating the stream containing water.

Statement 17. The method of statement 13, 14, 15, or 16, further comprising recirculating the stream containing oil.

Statement 18. The method of statement 13, 14, 15, 16, or 17, wherein the method is accomplished with existing facility equipment.

Statement 19. The method of statement 13, 14, 15, 16, 17, or 18, wherein the method is accomplished with temporary vessels.

Statement 20. A method may comprise: adding a first recirculation chemical composition to a hydrocarbon containing stream, wherein the first recirculation chemical composition is a hydrogen sulfide scavenger; adding a second recirculation chemical composition to the hydrocarbon containing stream, wherein the second recirculation chemical composition is an emulsion breaker; separating the hydrocarbon containing stream into a stream containing water and a stream containing oil; contacting the stream containing oil in a water wash unit; and removing residual emulsion breaker and hydrogen sulfide scavenger from the stream containing oil.

To facilitate a better understanding of the present disclosure, the following examples of certain aspects of some of the methods, compositions, and systems are given. In no way should the following examples be read to limit, or define, the entire scope of the disclosure.

Example 1

This experiment exemplifies an offshore facility that separates oil or condensate from incoming produced water. In this example, condensate was recirculated back to the wellhead to assist in hydrate control. The additional oil phase, as well as some anti-agglomerate chemistry entrained in the fluid, was necessary for successful application of anti-agglomerates in the production stream. The level of surfactant made separation of oil and water on a platform difficult and resulted in water that exceeds Oil and Grease ("O&G") specifications for overboard release. Therefore, a portion of the surfactant was removed from the oil phase prior to recirculation.

The following composition was utilized, wherein the composition included an appropriate recirculation chemical composition, wherein the recirculation chemical composition, or an additional chemical additive, functioned as an emulsion breaker to facilitate oil and water separation and to provide produced water within O&G specifications and to reduce the surfactant load in the recirculated hydrocarbon. After application of the recirculation chemical composition and primary separation of fluids, the oil was washed with water to remove the residual surfactant and emulsion breaker actives from the oil. This was necessary as the actives may interfere with anti-agglomerate application when the oil is recirculated through the system.

More specifically, the common laboratory, test used to simulate a mild water clarification process in the field is the Jar Test. The Jar Test comprises placing 500 ml of a laboratory prepared or actual field emulsion into 600 ml clear glass beakers (six at a time). The beakers were then placed on a six paddle Phipps & Bird stirrer and mixed at a high rate, referred to as the fast mix period. After a specified amount of time at high speed the mixing rate was reduced to a much slower rate for another specified amount of time, referred to as the slow mix period. The beakers were removed from the mixer and allowed to stand for another period of time. In this example, the fast mix period included mixing at 300 RPM for 5 Seconds, while the slow mix period used 60 RPM for 55 seconds, Residual methods specific to the surfactant and emulsion breaker chemistry were performed to estimate the amount of chemical washed from the hydrocarbon. For the surfactant chemistry, the method is a modification of a methylene blue dye transfer extraction while the emulsion breaker molecules were measured using a method based on liquid chromatography.

The laboratory studies utilized the existing surfactant load typical of field applications, which ranges from about 0.25% to about 2.0% in the hydrocarbon phase. The Jar Test consisted of primary separation of a 50/50 hydrocarbon to simulated production brine to allow for expedient testing. Field applications range from 1% to more than 90% water cut. An emulsion breaker, RPA-528, was added to the mixture at a typical treatment rate in the low ppm range, specifically 20 ppm for these trials. After primary separation in the Jar Test as described above, the hydrocarbon phase was removed from the Jar and washed with 6% fresh water at using the Jar Test procedure a second time. After collecting the hydrocarbon and water phases, residual measurements for the surfactant and the emulsion breaker suggested that 41-80% of the chemicals were removed from the oil. This rate of chemical removal was deemed sufficient for certifying the oil to be recirculated.

TABLE 1

Chemical Removal using 6% wash water

| Initial Surfactant Load (%) | Measured Residual after Primary Separation (%) | Measured Residual after Water Wash (%) | Chemical Reduction via Water Wash (%) | Emulsion Breaker Load (ppm) | Measured Residual after Primary Separation (ppm) | Measured Residual after Water Wash (ppm) | Chemical Reduction via Water Wash (%) |
|---|---|---|---|---|---|---|---|
| 0.25 | 0.17 | 0.10 | 41 | 20 | 11 | 6 | 45 |
| 0.5 | 0.31 | 0.13 | 55 | 20 | 8 | 4 | 50 |
| 1.0 | 0.78 | 0.28 | 64 | 20 | 9 | 4 | 56 |
| 1.5 | 0.91 | 0.18 | 80 | 20 | 13 | 3 | 77 |
| 2.0 | 1.25 | 0.27 | 78 | 20 | 8 | 3 | 63 |

Example 2

This example utilized oils with entrained hydrogen sulfide gas. It should be noted that hydrogen sulfide is considered high risk to human health. Typical export or purchase contracts specify reduction of H₂S levels using scavengers prior to sale or transport, as hydrogen sulfide can negatively interfere with refining systems.

This experiment tested an appropriate recirculation chemical composition that functioned as a hydrogen sulfide scavenger to facilitate reduction to hydrogen sulfide concentrations to the specifications set by the field, wherein the concentration may range from about 4 ppm up to about 1,000 ppm. For the purposes of laboratory testing, a specification of zero ppm (or complete removal of hydrogen sulfide) was set to allow for safe handling of fluids during the wash and measurement steps. The oil was dosed with 1000 ppm of a standard triazine scavenger and a calculated amount of hydrogen sulfide gas was bubbled through the hydrocarbon to ensure complete scavenging of hydrogen sulfide. After application of the hydrogen sulfide scavenger, the oil was checked with a Drager tube to ensure no excess hydrogen sulfide would evolve from the oil. The oil was then handled to approximate primary separation, then washed with water to remove the residual hydrogen sulfide scavenger and amines that remained after the primary separation step.

Again, the standard Jar Test method was utilized to confirm reduction of the residual scavenger chemistry and amines from the oil. For amine-based scavengers, the reduction in chemical load was confirmed by comparing the amine number of the treated oil before and after the water wash step. In this application, primary separation of the hydrocarbon and produced water was considered complete. The treated hydrocarbon was analyzed for scavenger chemistry and free amines and then washed with 2%-25% fresh water using the Jar Test method described previously. The hydrocarbon phase was then analyzed for residual scavenger and free amines, with the results suggesting a 48-91% reduction in the chemical load.

TABLE 2

Hydrogen Sulfide Scavenger-1000 ppm initial dose rate

| Wash Water (%) | Measured Spent Scavenger/Amine Residual after Primary Separation (ppm) | Measured Spent Scavenger/Amine Residual after Water Wash (ppm) | Chemical Reduction via Water Wash (%) | Emulsion Breaker Load (ppm) | Measured Residual after Primary Separation (ppm) | Measured Residual after Water Wash (ppm) | Chemical Reduction via Water Wash (%) |
|---|---|---|---|---|---|---|---|
| 2 | 865 | 441 | 49 | 20 | 9 | 4 | 56 |
| 5 | 823 | 395 | 48 | 20 | 10 | 3 | 70 |
| 10 | 908 | 332 | 63 | 20 | 13 | 7 | 46 |
| 20 | 876 | 135 | 80 | 20 | 10 | 4 | 60 |
| 25 | 881 | 79 | 91 | 20 | 13 | 3 | 77 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

All numerical values within the detailed description and the claims herein modified by "about" or "approximately" with respect to the indicated value are intended to consider experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A method comprising:
   adding a recirculation chemical composition to a hydrocarbon containing stream, wherein the recirculation chemical composition is a hydrogen sulfide scavenger;
   separating the hydrocarbon containing stream into a stream containing water and a stream containing oil in an oil/water separation unit, the hydrocarbon containing stream in fluid communication with a well;
   contacting the stream containing oil in a water wash unit, wherein the water wash unit comprises a separation equipment;
   removing residual hydrogen sulfide scavenger from the stream containing oil, wherein the stream containing oil is in fluid communication with the well; and
   further recirculating the stream containing water.

2. The method of claim 1, further comprising applying the hydrogen sulfide scavenger through an in-line injection system to disperse the hydrogen sulfide scavenger into the hydrocarbon containing stream before separating the hydrocarbon containing stream.

3. The method of claim 1, wherein the hydrogen sulfide scavenger comprises at least one additive including triazine scavengers.

4. The method of claim 1 further comprising recirculating the stream containing oil.

5. The method of claim 1, wherein the method is accomplished with existing facility equipment.

6. The method of claim 1, wherein the method is accomplished with temporary vessels.

7. The method of claim 1, further comprising contacting the hydrocarbon containing stream for up to 30 minutes prior to separating the hydrocarbon containing stream into a stream containing water and a stream containing oil.

8. The method of claim 1, wherein the recirculation chemical composition is added at a load of about 0.25% to about 2.0% of the hydrocarbon containing stream.

9. The method of claim 1, wherein the well comprises a nonlinear wellbore.

10. The method of claim 1, wherein about 5 ppm to about 200 ppm of the recirculation chemical composition are added.

11. The method of claim 1, further comprising drawing off a portion of the oil as an oil product steam.

12. The method of claim 11, wherein the remainder of oil from the oil containing stream is conveyed to a water wash unit.

13. The method of claim 12, wherein the remainder of the oil is conveyed as an oil slip stream.

14. The method of claim 1, further comprising conveying all of the oil containing stream to a water wash unit.

15. The method of claim 14, further comprising conveying the oil containing stream from the water wash unit to a wellhead.

16. The method of claim 15, further comprising adding an anti-agglomeration additive to the oil containing stream before the wellhead.

17. The method of claim 1, wherein the hydrocarbon containing stream comprises a viscosified treatment fluid.

18. The method of claim 1, wherein the hydrocarbon containing stream is a water-in-oil emulsion.

19. The method of claim 1, wherein the separating is performed with gravity.

* * * * *